United States Patent [19]
Hatchett et al.

[11] 4,131,199
[45] Dec. 26, 1978

[54] RECORD DISK CARTRIDGE

[75] Inventors: Michael R. Hatchett, Romsey; Leonard J. Rigbey, Winchester, both of England

[73] Assignee: International Business Machines Corporation, Armonk, N.Y.

[21] Appl. No.: 846,228

[22] Filed: Oct. 27, 1977

[30] Foreign Application Priority Data

Jun. 29, 1977 [GB] United Kingdom ............... 27124/77

[51] Int. Cl.$^2$ ..................... B65D 85/02; B65D 85/30; G11B 23/04
[52] U.S. Cl. ................................... 206/444; 206/303; 360/133
[58] Field of Search ............... 206/444, 312, 309, 303; 360/133; 229/17 SC

[56] References Cited

U.S. PATENT DOCUMENTS

| | | | |
|---|---|---|---|
| 1,844,952 | 2/1932 | Freedman et al. | 229/17 SC |
| 3,416,150 | 12/1968 | Lindberg, Jr. | 340/174.1 |
| 3,529,301 | 9/1970 | Hiruta | 360/133 |
| 3,593,327 | 7/1971 | Shill | 360/133 |

*Primary Examiner*—William T. Dixson, Jr.
*Attorney, Agent, or Firm*—Herbert F. Somermeyer

[57] ABSTRACT

A record disk cartridge has a single internal shutter for opening and closing a head access port adjacent a spindle access member in one wall. A further aperture allows the shutter to be actuated to an open position as the cartridge is moved into a playing position. The shutter also brakes the disk against movement when the cartridge apertures are closed. A magnetic coupling enables rotation of the disk inside the cartridge.

16 Claims, 4 Drawing Figures

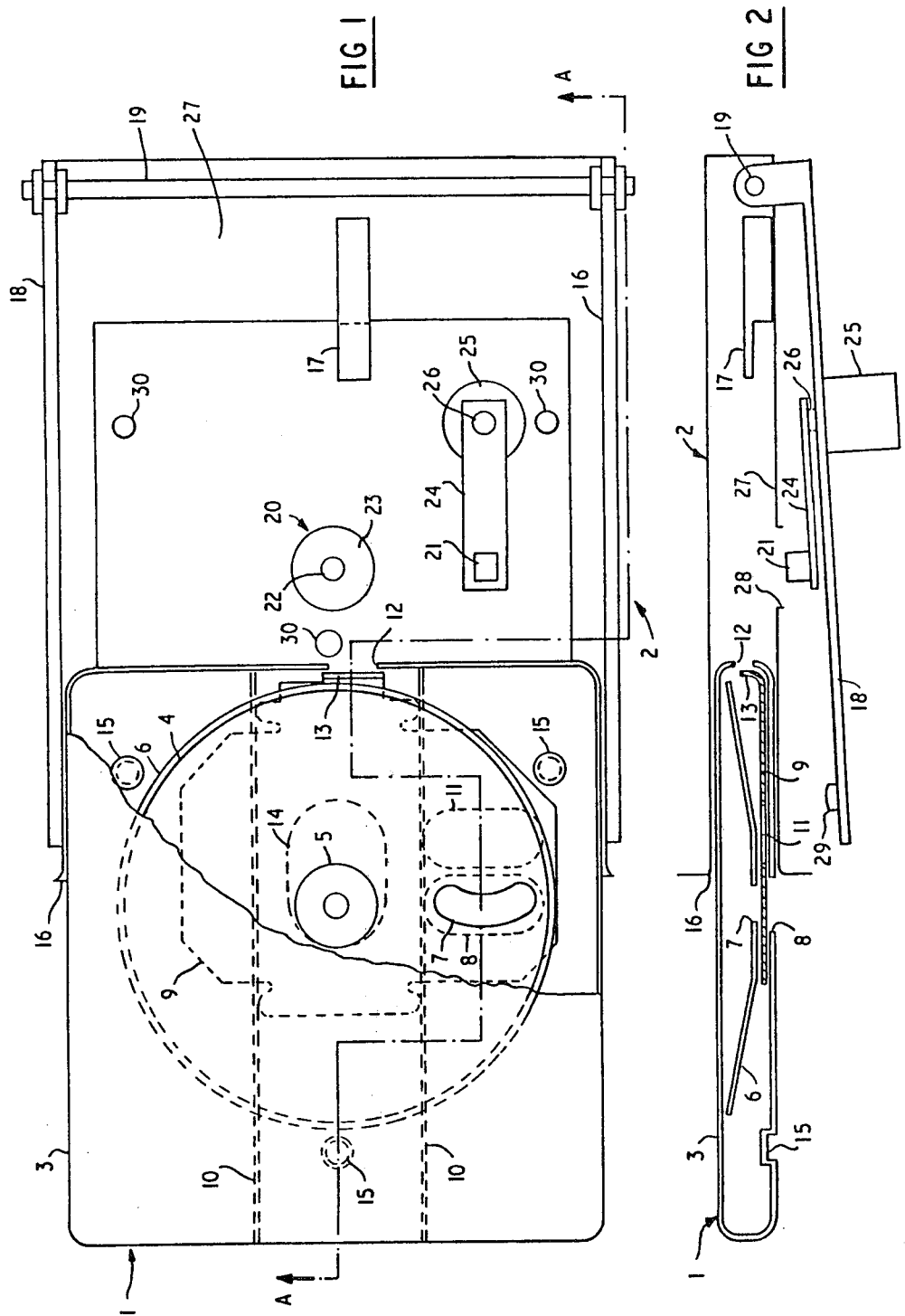

RECORD DISK CARTRIDGE

DOCUMENTS INCORPORATED BY REFERENCE

Copending, commonly assigned patent application serial number 775,233 filed Mar. 7, 1977 shows a backing plate and cartridge assembly related to the present invention.

Copending, commonly assigned patent application serial number 815,394 filed July 13, 1977 shows another embodiment of a backing plate.

BACKGROUND OF THE INVENTION

The invention relates to a record disk cartridge adapted to be installed for recording operations on a disk drive unit.

Random access disk stores have been used in data processing systems. Such disk stores employ a disk assembly of one or more rigid magnetically coated disks which can be mounted on a disk drive unit for recording and playback of data from the disk surfaces. Often the disks are contained within a cartridge or pack to facilitate handling and storage as well as to protect the surfaces of the disks during installation and removal from the disk drive. The cartridge prevents human contact with the disk surfaces and seals the disk assembly from airborne contaminants. Provision is made to allow the necessary connections to be made with the drive unit, including the introduction of one or more transducers into a transducing proximity to the disk surfaces and the attachment of the disk assembly to a drive shaft for rotation of the disks.

One such cartridge containing a rigid disk has been provided with an access door in its side which is automatically opened when the cartridge is installed on the drive unit to permit transducers contained within the drive unit to be inserted until they lie above the disk surfaces, respectively. When the the disks are up to operational speed, the transducers are loaded towards the disk surfaces until a suitable air bearing is established. Transducing operations then are performed over the disk surfaces in the usual way under control of a transducer actuator mechanism.

As track and bit densities increased and transducer flying heights became correspondingly smaller, it became increasingly important to ensure that the disk surfaces over which the transducers fly on their air bearings are free of contaminating particles which could lead to transducer crashes. The movement in the industry therefore was away from cartridges such as described above and more towards factory sealed data modules containing disks, transducers and either all or part of the transducer actuator mechanism. These modules were provided with a mechanical interface for rotating the enclosed disks and, where necessary, for connecting the remainder of the actuator, and an electrical interface for controlling the transducing operatings on the disks within the module.

At the same time, development of flexible record substrate material was taking place. An advantage of using flexible disks is that, the disk flies over the head in contrast to the reverse as in the case with rigid disks. Accordingly, a noncompliant head mounting can be used and the expensive suspension unit previously required can be dispensed with. Furthermore, flexible disks seem to be less affected by contamination than their rigid counterparts. This it is felt is due to the relatively low mass of the flexible material and its low inertia which enables it to lift over contaminants without causing damage to either transducer or disk surface. This has been found to be the case even for an average disk head operation as low as 10 microinches.

With the availability of thin flexible material, the development of a flexible disk cartridge was undertaken for installation during use of a drive unit containing the disk drive motor and the head actuator mechanism. Apertures are required in the cartridge to permit insertion of the head for accessing the surface of the disk and for connection of the disk to the drive motor. Although problems of contamination are not so great as with rigid disks, the considerable reduction of disk-to-head separation during operation makes it desirable to keep the disk enclosure as free of contaminants as possible. Thus apertures through the enclosure which exposes the disk should be closed when the cartridge is not in use on the drive. This closure prevents damage to the disk caused by operator contact during handling and ingress of at least gross contaminants during such handling, as well as during storage periods.

SUMMARY OF THE INVENTION

According to the invention, a record disk cartridge intended for use installed on a disk drive unit, comprises a disk enclosure, a flexible record disk and hub assembly supported within the enclosure for rotation about an axis, a first aperture through the enclosure to permit insertion therethrough of a record/playback head included in such a drive unit in a direction substantially parallel to said axis, a second aperture through the enclosure through which the disk and hub assembly may be engaged for rotation, a shutter mechanism within the enclosure movable from a first position closing the first aperture and to a second position for opening the first aperture, biasing means biasing the shutter mechanism towards said first position, and a second aperture through the enclosure through which prior to use said shutter mechanism is engaged and moved against the action of said biasing means to said second position.

The foregoing and other objects, features, and advantages of the invention will be apparent from the following more particular description of preferred embodiments of the invention, as illustrated in the accompanying drawings.

THE DRAWINGS

FIG. 1 shows a part cut-away plan view of a disk cartridge according to the present invention in the process of being loaded or installed on a disk drive unit.

FIG. 2 shows a part-sectional view taken along the line A—A in FIG. 1.

DETAILED DESCRIPTION

Figure 3:
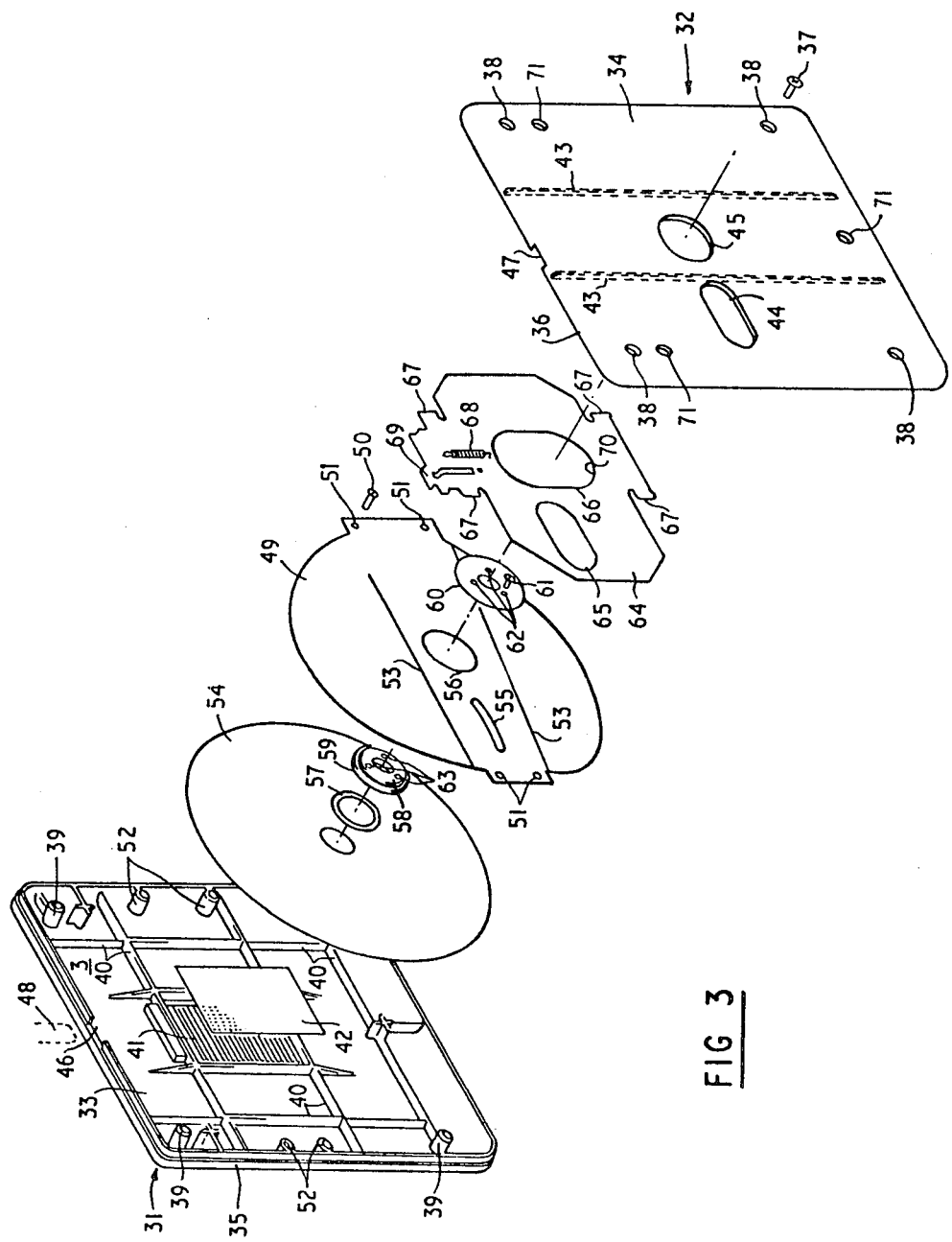
FIG. 3 is an exploded perspective view of the disk cartridge of FIGS. 1 and 2.

Cartridge 1, which will be described in more detail later, consists of a slim rectangular disk enclosure 3 containing a flexible record disk 4 (omitted from FIG. 2). Disk 4 has a central metal hub 5 for attachment to a drive motor in the drive unit by means of a magnetic chuck. Disk 4 is contained within enclosure 3 above circular backing plate 6 which stabilizes the rotating disk during use. The backing plate 6 in this embodiment is shaped by being bent along two chords (not shown in FIG. 1) to present a generally concave flying surface to flexible disk 4. An elongated slot 7 disposed radially with respect to the overlying disk through the backing plate 6 and a corresponding, though somewhat larger, slot 8 through one major face of the disk enclosure 3 permit insertion of a record and/or playback head into enclosure 3 for transducing operations on the surface of flexible disk 4 facing backing plate 6.

Further aligned holes (FIG. 3) are provided centrally disposed through the backing plate and disk enclosure respectively to permit attachment of the disk hub 5 to drive motor (not shown) for rotation of the disk 4. The construction of the disk hub 5 is such that it is supported for rotation and retained within the hole in the backing plate. In view of this complication, these holes are not shown in FIGS. 1 or 2 but are shown in the more detailed FIG. 3 which will be referred to later.

A full description of the backing plate 6 is to be found in copending, commonly assigned application for Letters Patent, supra. Although it is believed that such a backing plate produces better disk flying characteristics than do plates presenting different flying surfaces to the overlying disk, it should be clearly understood that it is not intended that the scope of the present invention should be limited in any way by the inclusion of this particular plate in the disk enclosure.

A slidable shutter 9 closes head slot 8 in disk enclosure 3 when the cartridge is not installed on a drive unit. The shutter 9 is supported by two rails 10 formed on the inside of the enclosure 3 and is provided with a head aperture 11 corresponding in shape and size to the head aperture 8 in the enclosure. Shutter 9 is spring loaded so that normally it is held in the position shown closing head aperture 8. A small shutter actuator access hole 12 in the leading edge of the cartridge 3 permits insertion of a pin 17 therethrough to engage upstanding lip 13 of shutter 9 to slide it along rails 10 to its open position in which the aperture 11 registers with head aperture 8. The actuator access hole 12 is off-centered so that the cartridge can only be installed on a drive when properly oriented.

The shutter 9 also has an aperture 14 through which the hub 5 of the disk may be engaged. Since the hub is retained in a hole 7 of backing plate 6, there is little space through which contaminants can enter enclosure 3. In this embodiment of the invention shutter 9 does not close the hub aperture through the enclosure but is sufficiently elongated to permit shutter movement between the closed and the open positions with the hub 5 exposed at all times. When in the open position the shutter 9 clearly must not impede rotation of the hub, however it has been found useful to arrange for the left hand edge of the aperture 14 (as viewed in FIG. 1) to abut the disk hub 5 when the shutter is in its closed position in order to restrain the hub from moving within the supporting aperture in the backing plate. Although only slight movement is possible with an unrestrained hub, vibrations could be induced which could lead to damage to the delicate disk surface by abrasion. Finally, three circular recess indentations 15 in the lower surface of the cartridge 1 cooperate with corresponding detent pins 29 in the drive 2 to positively locate the cartridge on the drive during use.

The disk drive 2 for receiving cartridges of the nature described above is provided with a front loading slot 16 into which a cartridge is inserted. A finger or pin 17 is located at the back of the slot in a position such that during the final stages of a cartridge loading operation it enters the shutter actuator hole 12 in the cartridge, contacts the shutter lip 13 and, as the cartridge is pushed into playing position, slides the shutter 9 to simultaneously open the head aperture 8 and to release the hub 5 for subsequent rotation of the drive.

A plate 18 is pivotally supported by pivot pin 19 to be movable towards and away from the slot 8 in order to bring a disk drive hub assembly 20 and record/playback head 21 into operating engagement with a disk cartridge installed on the drive unit. The drive hub assembly 20 (shown in FIG. 1 only) consists of a central spindle 22 rotatable by a drive motor (not shown) and a magnetic chuck 23. The head 21 is carried by an actuator mechanism of the type having a pivoted support arm 24 carrying the head at its free end and driven by a voice coil motor 25 operating directly on the arm spindle 26. Since that portion of the drive is not pertinent to the present invention, it is not further described.

After a cartridge 1 has been inserted into the slot 16 of the drive unit 2, the plate 18 is moved to, and retained in, its upper position by a latch mechanism not shown in the drawings. In this position the hub assembly 20 protrudes through a hole (not shown) in the base 27 of loading slot 16 into the cartridge and engages and supports for rotation the disk hub assembly 5. The head 21 also enters the cartridge by means of a slot 28 (shown only in FIG. 2) in the base 27 of the cartridge loading slot 16 and the now open head aperture 8. The actuator mechanism is constructed so that the head 21 protrudes beyond the backing plate 6 and into the plane of rotation of the disk 4. During operation, air bearings are generated between the disk and the backing plate and between the disk and the head. More details of the disk flying characteristics are to be found in our aforesaid copending, commonly assigned application. Finally, detent pins 29 (only one shown) carried by plate 18 respectively extend through holes 30 in the base 27 and into the locating recesses 15 in the underside of the cartridge 1. The cartridge is thus retained accurately located on the drive unit until the plate 18 is retracted at the end of an operation.

FIG. 3 shows a detailed exploded view of the cartridge shown in FIGS. 1 and 2. The disk enclosure is provided by rectangular cover 31 shaped to form a pressfit with a corresponding rectangular base 32. The cover and base consist essentially of rectangular web portions 33 and 34 which form the major faces of the cartridge 1 surrounded by stepped peripheral walls 35 and 36 which form the sides. A stepped inner flange of wall 35 forms an air-tight fit with complementary outer flange of wall 36. The base 32 and cover 31 are pressed together and held by screws 37 (only one shown) through holes 38 in the base received in threaded bosses 39 on the inside of cover 31.

The rectangular web portion 33 of the cover is strengthened by longitudinal orthogonal ribs 40 distributed over its inner surface. Ventilation slots 41 are provided in the cover through a central rectangular area defined by the ribs 40. A filter 42 covers the slots to prevent ingress of contaminants to the disk enclosure. Similar strengthening ribs are provided on the inside of the base 32 but only two which provide the guide rails 43 for the cartridge shutter are shown in FIG. 3. The base 32 has an elongated head aperture 44 and a central hub aperture 45. Cut-away portions 46 and 47 respectively in the walls of cover 31 and base 32, produce an offset slot through which a pin 48 (shown dotted) forming part of the drive is inserted during loading to operate the shutter mechanism as described above.

A disk backing plate 49 as described in said copending, commonly assigned application is attached to the inside of cover 31 by means of screws 50 (only one shown) which pass through holes 51 in the plate 49 and are received in threaded bosses 52 on the inside of cover 31. As stated previously, the backing plate 49 is bent along two chords 53 to provide a concave flying surface for a flexible record disk 54 which is movably contained between it and the inside surface of the cover 31. A head aperture 55 and a hub aperture 56 are provided through the backing plate 49.

The flexible disk 54 is supported by a hub assembly to which it is attached by a ring or collet of adhesive 57. The hub assembly is formed from two parts, an annular ring 58 of suitable plastic material with a peripheral flange 59 and a metal hub plate 60. The annular ring 58 passes through the hub aperture 56 in the backing plate 49 and is retained therein by the hub plate 60 which is attached thereto by means of screws 61 (only one shown) passing through holes 62 in the plate 60 and into threaded holes 63 in annular ring 58. The dimensions of these components are such that the hub assembly is supported through the aperture 56 in the backing plate 49 with sufficient clearance to permit unimpeded rotation of the hub assembly 58, 59.

An aperture shutter 64 has a head aperture 65 and a hub aperture 66. Downwardly bent lugs 67 are located between the guide rails 43 on the inside of the base 32. The inside edges of the rails 43 are cut away to accommodate and retain the lugs 67 thus enabling the shutter 64 to be slid up and down between the rails 43. A tension spring 68 attached at one end of the shutter 64 and at the other end of the inside edge of the cartridge retains the shutter at one end of the rails for closing the head aperture 44 in the cartridge. As previously explained, the shutter 64 is automatically slid to its open position with head apertures 44 and 45 in registration during the loading operation by a pin 48 in the drive unit entering the cartridge and engaging raised lip 69 on the shutter. The hub aperture 66 of shutter 64 is sufficiently elongated to give clearance to the hub assembly 58, 59 at all times except when in the fully closed position when the edge 70 engages the hub assembly 58, 59 and restrains it against vibrational or other movement within the backing plate aperture 56. Finally, indentations or recesses 71 are provided in the base 32 of the cartridge to cooperate with detent pins 29 in the drive unit to hold the cartridge accurately located on the drive during operation.

Figure 4:
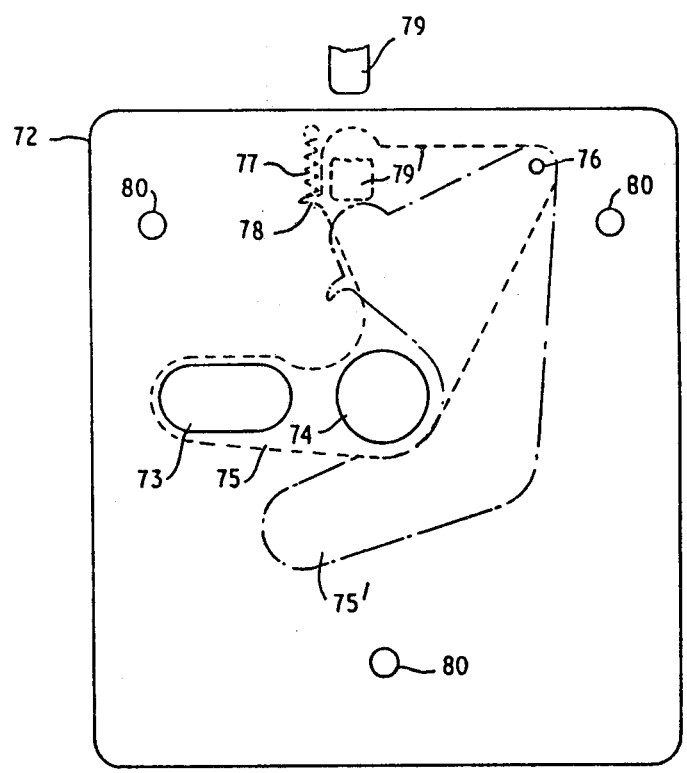
FIG. 4 shows another arrangement of a shutter mechanism for the cartridge shown in FIG. 3.

FIG. 4 shows another shutter mechanism to that so far described which operates with a pivoting action to close both head and hub apertures of a cartridge when it is not in use as a drive. The figure shows a simplified plan view of the base 72 of a cartridge provided with a head aperture 73 and a hub aperture 74. A shutter 75 is shown in dashed outline in its retracted or closed position pivotally mounted on pivot pin 76. A tension spring 77 connected between a lug 78 on the shutter and a point on the inside edge of the cartridge normally holds the shutter in the retracted position closing both apertures 73 and 74. A raised lip (not shown) is provided on the shutter 75 to abut the hub assembly 58, 59 when in the retracted or closed position to prevent unwanted hub movement when the cartridge is not in use on a drive.

The shutter 75 is moved to its open position (shown chain dotted line in 75') as before by a pin 79 forming part of the drive unit. The pin is shown dotted in 79' inside the cartridge holding the shutter in its open position 75' against the action of spring 77. The shape of the shutter is such that both apertures 73 and 74 in the cartridge are completely unobstructed by the shutter 75 when in its open position 75'. Indentations or recesses 80 are provided for cartridge location as previously described.

Various modifications to the apparatus described will be apparent to one skilled in the art without departing from the invention. For example, although the described installation of a cartridge on a drive unit involves moving that portion of the drive unit including the actuator mechanism and disk drive hub towards the inserted cartridge, clearly these components could be fixed and the cartridge moved towards them instead. Further although the cartridge shutter mechanism is automatically opened by a fixed pin as the cartridge is pushed into the loading slot, various other arrangements for opening the head aperture before a head is inserted are possible. For example, it will be apparent that an arrangement is possible in which the cartridge is fully pushed home into the loading slot leaving the head aperture closed to be opened later by a pin activated in response, for example, to movement of the actuator mechanism and hub towards the cartridge. The shutter mechanism can be magnetically actuated as well, provided of course suitable precautions are taken to prevent erasure of disk recordings.

The record disk may be formed from any medium on which data may be recorded by a suitable transducing system with relative movement between the medium and the transducing system.

While the invention has been particularly shown and described with reference to preferred embodiments thereof, it will be understood by those skilled in the art that various changes in form and details may be made therein without departing from the spirit and scope of the invention.

What is claimed is:

1. A record disk cartridge intended for use installed on a disk drive unit, the cartridge comprising a disk enclosure, a flexible record disk and hub assembly supported within the enclosure for rotation about an axis, said enclosure having first, second and third apertures, said first aperture through the enclosure to permit insertion therethrough of a record/playback head included in such a drive unit in the direction substantially parallel to said axis, said second aperture being through the enclosure through which the disk and hub assembly may be engaged for rotation, a shutter mechanism within the enclosure movable between a first position closing said first aperture and a second position opening said first aperture, biasing means biasing said shutter mechanism towards said first position, said third aperture through the enclosure through which prior to use said shutter mechanism is engaged and moved against the action of said biasing means to said second position, said shutter being in frictional engagement with said hub assembly when in said first position and completely disengaged from said hub assembly when in said second position.

2. A cartridge as claimed in claim 1, in which the shutter mechanism comprises a plate supported within said enclosure for sliding motion between said first and second positions, said plate having an aperture therethrough which registers with said first aperture in the enclosure when the shutter is in said second position and a second elongated aperture with a circular end portion for receiving said hub assembly to enable said frictional engagement by said circular end portion in said first position.

3. A cartridge as claimed in claim 2, in which said shutter mechanism second elongated aperture has a size and shape to leave said second aperture in said enclosure open irrespective of any position of said shutter mechanism.

4. A cartridge as claimed in claim 3, further including two parallel strengthening ribs on the inside of the enclosure support said shutter mechanism for sliding motion between said first and second positions.

5. A cartridge as claimed in claim 1, further including pivotal support means within said enclosure for supporting said shutter mechanism for pivotal motion between said first and second positions, said shutter mechanism being a flat plate shaped to cover said first aperture when the shutter is in the first position but not to cover the first aperture when the shutter is in the second position and having a second aperture receiving said hub assembly and of such extent to keep said second aperture of said enclosure uncovered by said shutter mechanism at all positions thereof.

6. A cartridge as claimed in claim 1, in which said third aperture in said enclosure is positioned so that during installation of the cartridge on a disk drive unit, means included in the disk drive unit enter said enclosure through the third aperture to contact and move said shutter mechanism from the first to the second position.

7. A cartridge as claimed in claim 6, in which the third aperture is asymmetrically disposed in said enclosure.

8. A cartridge as claimed in claim 1, in which said disk enclosure is adapted to be received, during installation on a drive unit, into a slot forming part of the drive unit, the arrangement being such that during movement of the enclosure into the slot, a pin fixed within the slot enters said third aperture and engages the shutter mechanism causing relative movement between said shutter and said enclosure in response to further movement of the enclosure into the slot, the extent of movement being such that when said enclosure is fully received within said slot, the shutter mechanism is fully in said second position.

9. A cartridge as claimed in claim 1, further having a backing plate with a first aperture registering with said first aperture in said enclosure and a second aperture registering with said second aperture in the enclosure.

10. A cartridge as claimed in claim 9, in which said hub assembly is supported for rotation by and retained in said second aperture in said backing plate.

11. A cartridge as claimed in claim 1, in which said enclosure consists of a cover having a substantially flat major surface surrounded by a relatively low peripheral wall and a base also having a substantially flat major surface surrounded by a relatively low peripheral wall, said cover and base being molded from plastic material and the peripheral walls having complementary shaped edges so that they form a press-fit when said base and cover are assembled to form said enclosure.

12. A record disk cartridge, including in combination:
a plate like enclosure having spaced apart face plates and a peripheral wall joining said face plates,
a circular record member having a signal receiving surface and being inside said enclosure and disposed therein for rotation about the given axis extending transverse to the extent of said face plates, a hub means on said record member coaxial to said given axis,
one of said face plates having a radially elongated slot facing said signal receiving surface, and
a shutter member movably disposed on said one face plate and adapted for motions for covering and uncovering said aperture and when closing said aperture engaging said hub means to inhibit motion of said record member as long as said aperture is covered.

13. A record disk cartridge set forth in claim 12, wherein said shutter member comprises a plate having an aperture aligned with said hub means and being elongated in one direction for allowing relative motion of said shutter member with respect to said hub means and a second aperture adapted to be aligned with said radially elongated slot in one position of said shutter member, said central aperture of said shutter member being shaped such that when said radially elongated slot and said second aperture of said shutter member are aligned, said shutter member is free of said hub means.

14. A record disk cartridge set forth in claim 13, further including a backing plate fixedly secured to said plate like enclosure, said shutter member being movably disposed between said backing plate and said plate like enclosure, and
said hub means being rotatably secured to said backing plate member with said backing plate member having an elongated slot registered with said elongated slot of said plate like enclosure.

15. The record disk cartridge set forth in claim 12, further including a pivot pin inside said enclosure,
said shutter member being pivotally mounted on said pivot pin for pivoting actions between elongated slot closing and elongated slot opening positions.

16. The record disk cartridge set forth in claim 15, wherein said enclosure has an access opening facing said shutter member and adapted to receive an opening pin for moving said shutter member between opened and closed positions and means inside said enclosure yieldably urging said shutter member to said closed position.

* * * * *